(12) United States Patent
Bakis et al.

(10) Patent No.: US 6,556,972 B1
(45) Date of Patent: Apr. 29, 2003

(54) METHOD AND APPARATUS FOR TIME-SYNCHRONIZED TRANSLATION AND SYNTHESIS OF NATURAL-LANGUAGE SPEECH

(75) Inventors: Raimo Bakis, Briarcliff Manor, NY (US); Mark Edward Epstein, Katonah, NY (US); William Stuart Meisel, Tarzana, CA (US); Miroslav Novak, Mohegan Lake, NY (US); Michael Picheny, White Plains, NY (US); Ridley M. Whitaker, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,986

(22) Filed: Mar. 16, 2000

(51) Int. Cl.[7] ............................................... G10L 21/00
(52) U.S. Cl. ......................... 704/277; 704/270; 704/2; 704/9
(58) Field of Search ............................... 704/2, 3, 4, 8, 704/9, 231, 235, 256, 266, 277, 270

(56) References Cited

U.S. PATENT DOCUMENTS

| | | | | |
|---|---|---|---|---|
| 5,329,446 A | * | 7/1994 | Kugimiya et al. | 384/419.04 |
| 5,425,129 A | * | 6/1995 | Garman et al. | 704/256 |
| 5,797,123 A | * | 8/1998 | Chou et al. | 704/256 |
| 5,848,389 A | * | 12/1998 | Asano et al. | 704/239 |
| 6,233,544 B1 | * | 5/2001 | Alshawi | 704/2 |
| 6,266,642 B1 | * | 7/2001 | Franz et al. | 704/277 |
| 6,275,792 B1 | * | 8/2001 | Lewis | 704/9 |
| 6,278,968 B1 | * | 8/2001 | Franz et al. | 704/3 |
| 6,308,157 B1 | * | 10/2001 | Vanbuskirk et al. | 704/275 |
| 6,321,188 B1 | * | 11/2001 | Hayashi et al. | 704/4 |
| 6,356,865 B1 | * | 3/2002 | Franz et al. | 704/2 |
| 6,374,224 B1 | * | 4/2002 | Horiguchi et al. | 704/266 |

* cited by examiner

Primary Examiner—Susan McFadden
(74) Attorney, Agent, or Firm—Ryan, Mason & Lewis, LLP; Thu Ann Dang

(57) ABSTRACT

A multi-lingual time-synchronized translation system and method provide automatic time-synchronized spoken translations of spoken phrases. The multi-lingual time-synchronized translation system includes a phrase-spotting mechanism, optionally, a language understanding mechanism, a translation mechanism, a speech output mechanism and an event measuring mechanism. The phrase-spotting mechanism identifies a spoken phrase from a restricted domain of phrases. The language understanding mechanism, if present, maps the identified phrase onto a small set of formal phrases. The translation mechanism maps the formal phrase onto a well-formed phrase in one or more target languages. The speech output mechanism produces high-quality output speech using the output of the event measuring mechanism for time synchronization. The event-measuring mechanism measures the duration of various key events in the source phrase. Event duration could be, for example, the overall duration of the input phrase, the duration of the phrase with interword silences omitted, or some other relevant durational features. The present invention recognizes the quality improvements can be achieved by restricting the task domain under consideration.

57 Claims, 6 Drawing Sheets

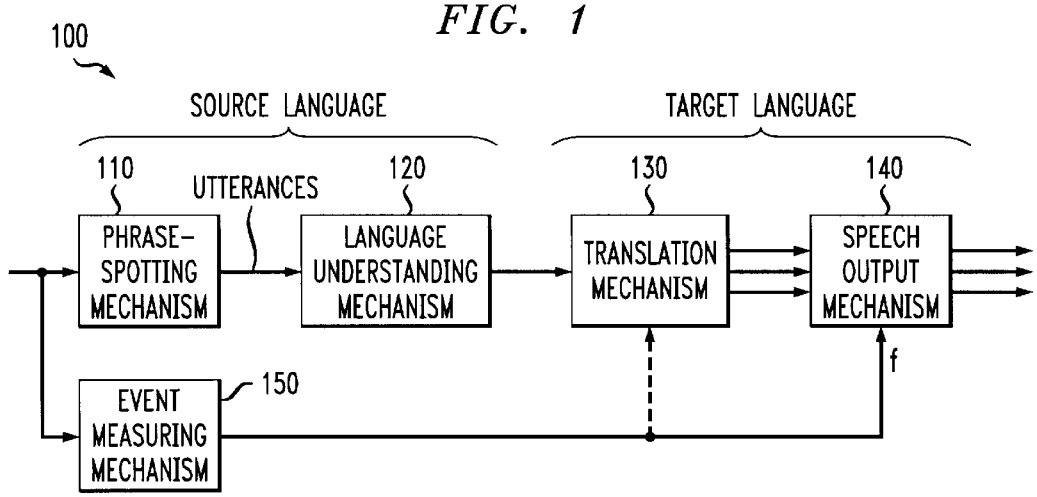
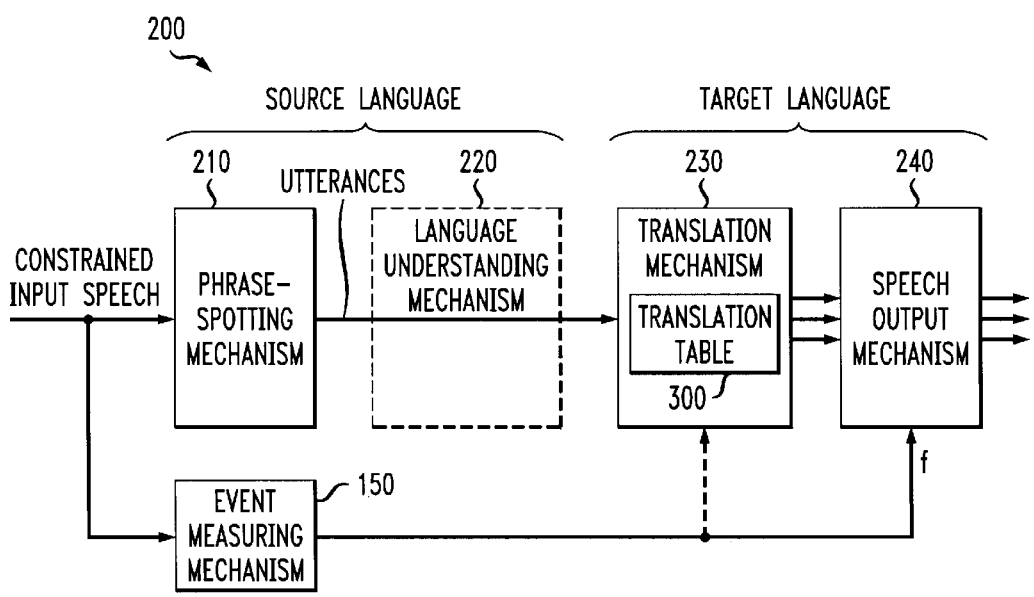

FIG. 3
TRANSLATION TABLE 300

| PREDEFINED WORD/PHRASE (SOURCE LANGUAGE) 330 | TRANSLATION– TARGET LANGUAGE 1 350 | ... | TRANSLATION– TARGET LANGUAGE N 360 |
|---|---|---|---|
| THE DOW JONES AVERAGE ROSE TODAY (305) | Le Dow Jones est monté aujourd'hui | ... | Dow Jones prumer se zvedl |
| THE NASDAQ FELL IN HEAVY TRADING (310) | Le NASDAQ a baissé au cours d'une séance active | ... | NASDAQ klesl behem silneho obchodovani |
| ... (315) | ... | ... | ... |
| THE NEW YORK STOCK EXCHANGE SUSPENDED TRADING (320) | Le New York Stock Exchange a suspendu les quotations | ... | Newyorska burza zastavila obchodovani |

FIG. 5

TEMPLATE-BASED TRANSLATION TABLE
500

| PREDEFINED WORD/PHRASE (SOURCE LANGUAGE) 530 | TRANSLATION- TARGET LANGUAGE 1  550 | ... | TRANSLATION- TARGET LANGUAGE N  560 |
|---|---|---|---|
| THE DOW JONES AVERAGE ROSE 150 POINTS IN HEAVY TRADING (505) | Le Dow Jones a gagné <number> points lors d'une séance particulièrement active | ... | Dow Jones prumer vcera vzrostl o <number> bodu behem silneho obchodovani |
| THE NASDAQ FELL 29 POINTS (510) | Le NASDAQ a perdu <number> points | ... | NASDAQ klesl o <number> bodu |
| ... (515) | ... | ... | ... |
| THE HANSANG INDEX FELL 3% YESTERDAY (520) | Le Hansang a perdu <percent> hier | ... | Hansang index klesl o <percent> |

FIG. 7
PHRASE-BASED TRANSLATION TABLE 700

| PREDEFINED WORD/PHRASE (SOURCE LANGUAGE) 730 | TRANSLATION— TARGET LANGUAGE 1 750 | ... | TRANSLATION— TARGET LANGUAGE N 760 |
|---|---|---|---|
| THE DOW ROSE 150 POINTS IN HEAVY TRADING (705) | Le Dow Jones a gagné 150 points lors d'une séance particulièrement active | ... | Dow Jones prumer vcera vzrostl o 150 bodu behem silneho obchodovani |
| THE DOW JONES AVERAGE ROSE 150 POINTS. SHARE VOLUME WAS HIGH (710) | Le Dow Jones a gagné 150 points lors d'une séance particulièrement active | ... | Dow Jones prumer vcera vzrostl o 150 bodu behem silneho obchodovani |
| ... (715) | ... | ... | ... |
| IN UNUSUALLY HIGH TRADING VOLUME, THE DOW ROSE 150 POINTS (720) | Le Dow Jones a gagné 150 points lors d'une séance particulièrement active | ... | Dow Jones prumer vcera vzrostl o 150 bodu behem silneho obchodovani |

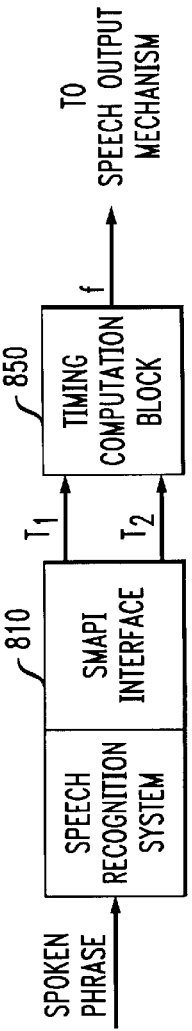

FIG. 8 800

METHOD AND APPARATUS FOR TIME-SYNCHRONIZED TRANSLATION AND SYNTHESIS OF NATURAL-LANGUAGE SPEECH

FIELD OF THE INVENTION

The present invention relates generally to speech-to-speech translation systems and, more particularly, to methods and apparatus that perform automated speech translation.

BACKGROUND OF THE INVENTION

Speech recognition techniques translate an acoustic signal into a computer-readable format. Speech recognition systems have been used for various applications, including data entry applications that allow a user to dictate desired information to a computer device, security applications that restrict access to a particular device or secure facility, and speech-to-speech translation applications, where a spoken phrase is translated from a source language into one or more target languages. In a speech-to-speech translation application, the speech recognition system translates the acoustic signal into a computer readable format, and a machine translator reproduces the spoken phrase in the desired language.

Multilingual speech-to-speech translation has typically required the participation of a human translator to translate a conversation from a source language into one or more target languages. For example, telephone service providers, such as AT&T Corporation, often provide human operators that perform language translation services. With the advances in the underlying speech recognition technology, however, automated speech-to-speech translation may now be performed without requiring a human translator. Automated multilingual speech-to-speech translation systems will provide multilingual speech recognition for interactions between individuals and computer devices. In addition, such automated multilingual speech-to-speech translation systems can also provide translation services for conversations between two individuals.

A number of systems have been proposed or suggested that attempt to perform speech-to-speech translation. For example, Alex Waibel, "Interactive Translation of Conversational Speech", Computer, 29(7), 41–48 (1996), hereinafter referred to as the "Janus II System," discloses a computer-aided speech translation system. The Janus II speech translation system operates on spontaneous conversational speech between humans. While the Janus II System performs effectively for a number of applications, it suffers from a number of limitations, which if overcome, could greatly expand the accuracy and efficiency of such speech-to-speech translation systems. For example, the Janus II System does not synchronize the original source language speech and the translated target language speech.

A need therefore exists for improved methods and apparatus that perform automated speech translation. A further need exists for methods and apparatus for synchronizing the original source language speech and the translated target language speech in a speech-to-speech translation system. Yet another need exists for speech-to-speech translation methods and apparatus that automatically translate the original source language speech into a number of desired target languages.

SUMMARY OF THE INVENTION

Generally, the present invention provides a multi-lingual time-synchronized translation system. Thus, the present invention is directed to a method and apparatus for providing automatic time-synchronized spoken translations of spoken phrases. The multi-lingual time-synchronized translation system includes a phrase-spotting mechanism, optionally, a language understanding mechanism, a translation mechanism, a speech output mechanism and an event measuring mechanism. The phrase-spotting mechanism identifies a spoken phrase from a restricted domain of phrases. The language understanding mechanism, if present, maps the identified phrase onto a small set of formal phrases. The translation mechanism maps the formal phrase onto a well-formed phrase in one or more target languages. The speech output mechanism produces high-quality output speech using the output of the event measuring mechanism for time synchronization.

The event-measuring mechanism measures the duration of various key events in the source phrase. For example, the speech can be normalized in duration using event duration information and presented to the user. Event duration could be, for example, the overall duration of the input phrase, the duration of the phrase with interword silences omitted, or some other relevant durational features.

In a template-based translation embodiment, the translation mechanism maps the static components of each phrase over directly to the speech output mechanism, but the variable component, such as a number or date, is converted by the translation mechanism to the target language using a variable mapping mechanism. The variable mapping mechanism may be implemented, for example, using a finite state transducer. The speech output mechanism employs a speech synthesis technique, such as phrase-splicing, to generate high quality output speech from the static phrases with embedded variables. It is noted that the phrase splicing mechanism is inherently capable of modifying durations of the output speech allowing for accurate synchronization.

In a phrase-based translation embodiment, the output of the phrase spotting mechanism is presented to a language understanding mechanism that maps the input sentence onto a relatively small number of output sentences of a variable form as in the template-based translation described above. Thereafter, translation and speech output generation may be performed in a similar manner to the template-based translation.

The present invention recognizes the quality improvements can be achieved by restricting the task domain under consideration. This considerably simplifies the recognition, translation and synthesis problems to the point where near perfect accuracy can be obtained.

A more complete understanding of the present invention, as well as further features and advantages of the present invention, will be obtained by reference to the following detailed description and drawings.

BRIEF DESCRIPTION OF THE DRAWINGS

FIG. 1 is a schematic block diagram of a multi-lingual time-synchronized translation system in accordance with the present invention;

FIG. 2 is a schematic block diagram of a table-based embodiment of a multi-lingual time-synchronized translation system in accordance with the present invention;

FIG. 3 is a sample table from the translation table of FIG. 2;

FIG. 5 is a sample table from the template-based translation table of FIG. 4;

FIG. 7 is a sample table from the phrase-based translation table of FIG. 6; and

FIG. 8 is a schematic block diagram of the event measuring mechanism of FIGS. 1, 2, 4 or 6.

DETAILED DESCRIPTION OF PREFERRED EMBODIMENTS

Figure 4:
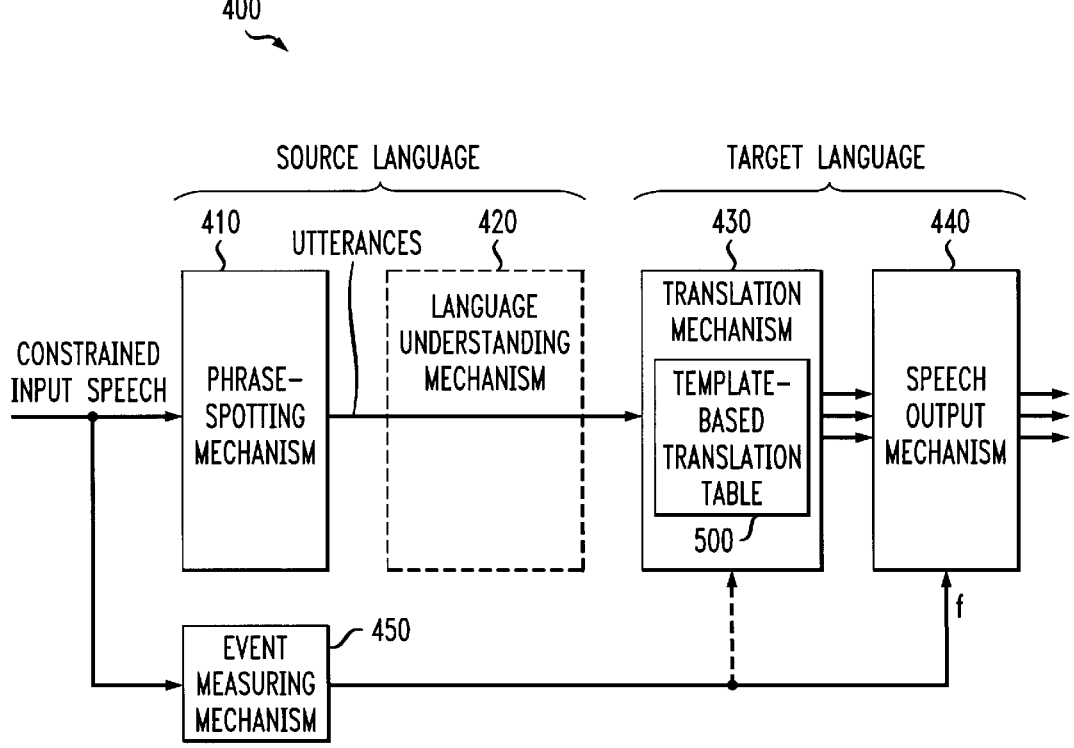
FIG. 4 is a schematic block diagram of a template-based embodiment of a multi-lingual time-synchronized translation system in accordance with the present invention.

FIG. 1 is a schematic block diagram of a multi-lingual time-synchronized translation system 100 in accordance with the present invention. The present invention is directed to a method and apparatus for providing automatic time-synchronized spoken translations of spoken phrases. As used herein, the term time-synchronized means the duration of the translated phrase is approximately the same as the duration of the original message. Generally, it is an object of the present invention to provide high-quality time-synchronized spoken translations of spoken phrases. In other words, the spoken output should have a natural voice quality and the translation should be easily understandable by a native speaker of the language. The present invention recognizes the quality improvements can be achieved by restricting the task domain under consideration. This considerably simplifies the recognition, translation and synthesis problems to the point where near perfect accuracy can be obtained.

As shown in FIG. 1, the multi-lingual time-synchronized translation system 100 includes a phrase-spotting mechanism 110, a language understanding mechanism 120, a translation mechanism 130, a speech output mechanism 140 and an event measuring mechanism 150. The multi-lingual time-synchronized translation system 100 will be discussed hereinafter with three illustrative embodiments, of varying complexity. While the general block diagram shown in FIG. 1 applies to each of the three various embodiments, the various components within the multi-lingual time-synchronized translation system 100 may change in accordance with the complexity of the specific embodiment, as discussed below.

Generally, the phrase-spotting mechanism 110 identifies a spoken phrase from a restricted domain of phrases. The phrase-spotting mechanism 110 may achieve higher accuracy by restricting the task domain. The language understanding mechanism 120 maps the identified phrase onto a small set of formal phrases. The translation mechanism 130 maps the formal phrase onto a well-formed phrase in one or more target languages. The speech output mechanism 140 produces high-quality output speech using the output of the event measuring mechanism 150 for time synchronization. The event-measuring mechanism 150, discussed further below in conjunction with FIG. 8, measures the duration of various key events in the source phrase. The output of the event-measuring mechanism 150 can be applied to the speech output mechanism 140 or the translation mechanism 130 or both. The event-measuring mechanism 150 can provide a message to the translation mechanism 130 to select a longer or shorter version of a translation for a given word or phrase. Likewise, the event-measuring mechanism 150 can provide a message to the speech output mechanism 140 to compress or stretch the translation for a given word or phrase, in a manner discussed below.

TABLE-BASED TRANSLATION

In a table-based translation embodiment, shown in FIG. 2, the phrase spotting mechanism 210 can be a speech recognition system that decides between a fixed inventory of preset phrases for each utterance. Thus, the phrase-spotting mechanism 210 may be embodied, for example, as the IBM ViaVoice Millenium Edition™ (1999), commercially available from IBM Corporation, as modified herein to provide the features and functions of the present invention.

In the table-based translation embodiment, there is no formal language understanding mechanism 220, and the translation mechanism 230 is a table-based lookup process. In other words, the speaker is restricted to a predefined canonical set of words or phrases and the utterances will have a predefined format. The constrained utterances are directly passed along by the language understanding mechanism 220 to the translation mechanism 230. The translation mechanism 230 contains a translation table 300 containing an entry for each recognized word or phrase in the canonical set of words or phrases. The speech output mechanism 240 contains a prerecorded speech table (not shown) consisting of prerecorded speech for each possible source phrase in the translation table 300. The prerecorded speech table may contain a pointer to an audio file for each recognized word or phrase.

As discussed further below in conjunction with FIG. 8, the speech is normalized in duration using event duration information produced by the event duration measurement mechanism 250, and presented to the user. Event duration could be the overall duration of the input phrase, the duration of the phrase with interword silences omitted, or some other relevant durational features.

As previously indicated, the translation table 300, shown in FIG. 3, preferably contains an entry for each word or phrase in the canonical set of words or phrases. The translation table 300 translates each recognized word or phrase into one or more target languages. As shown in FIG. 3, the translation table 300 maintains a plurality of records, such as records 305–320, each associated with a different recognized word or phrase. For each recognized word or phrase identified in field 330, the translation table 300 includes a corresponding translation into each desired target language in fields 350 through 360.

In an alternate implementation of the translation table 300, the present invention provides multiple output sentences for a given word or phrase. In this embodiment, each output sentence for a given word or phrase reflects a different emotional emphasis and could be selected automatically, or manually as desired, to create a specific emotional effect. For example, the same output sentence for a given word or phrase can be recorded three times, to selectively reflect excitement, sadness or fear. In further variations, the same output sentence for a given word or phrase can be recorded to reflect different accents, dialects, pitch, loudness or rates of speech. Changes in the volume or pitch of speech can be utilized, for example, to indicate a change in the importance of the content of the speech. The variable rate of speech outputs can be used to select a translation that has a best fit with the spoken phrase. In various embodiments, the variable rate of speech can supplement or replace the compression or stretching performed by the speech output mechanism. In yet another variation, time adjustments can be achieved by leaving out less important words in a translation, or inserting fill words (in addition, to, or as an alternative to, compression or stretching performed by the speech output mechanism).

TEMPLATE-BASED TRANSLATION

In a template-based translation embodiment, shown in FIG. 4, the phrase spotting mechanism 410 can be a grammar-based speech recognition system capable of recognizing phrases with embedded variable phrases, such as names, dates or prices. Thus, there are variable fields on the input and output of the translation mechanism. Thus, the phrase-spotting mechanism 410 may be embodied, for example, as the IBM ViaVoice Millenium Edition™ (1999), commercially available from IBM Corporation, as modified herein to provide the features and functions of the present invention.

In the template-based translation embodiment, there is again no formal language understanding mechanism 420, and the speaker is restricted to a predefined canonical set of words or phrases. Thus, the utterances produced by the phrase-spotting mechanism 410 will have a predefined format. The constrained utterances are directly passed along by the language understanding mechanism 420 to the translation mechanism 430. The translation mechanism 430 is somewhat more sophisticated than the table-based translation embodiment discussed above. The translation mechanism 430 contains a translation table 500 containing an entry for each recognized word or phrase in the canonical set of words or phrases. The translation mechanism 430 maps the static components of each phrase over directly to the speech output mechanism 440, but the variable component, such as a number or date, is converted by the translation mechanism 430 to the target language using a variable mapping mechanism.

The variable mapping mechanism may be implemented, for example, using a finite state transducer. For a description of finite state transducers see, for example, Finite State Language Processing, E. Roche and Y. Schabes, eds. MIT Press 1997, incorporated by reference herein. The translation mechanism 430 contains a template-based translation table 500 containing an entry for each recognized phrase in the canonical set of words or phrases, but having a template or code indicating the variable components. In this manner, entries with variable components contain variable fields.

The speech output mechanism 440 employs a more sophisticated high quality speech synthesis technique, such as phrase-splicing, to generate high quality output speech, since there are no longer static phrases but static phrases with embedded variables. It is noted that the phrase splicing mechanism is inherently capable of modifying durations of the output speech allowing for accurate synchronization. For a discussion of phrase-splicing techniques, see, for example, R. E. Donovan, M. Franz, J. Sorensen, and S. Roukos (1998) "Phrase Splicing and Variable Substitution Using the IBM Trainable Speech Synthesis System" ICSLP 1998, Australia, incorporated by reference herein.

As previously indicated, the template-based translation table 500, shown in FIG. 5, preferably contains an entry for each word or phrase in the canonical set of words or phrases. The template-based translation table 500 translates the static components of each recognized word or phrase into one or more target languages and contains an embedded variable for the dynamic components. As shown in FIG. 5, the template-based translation table 500 maintains a plurality of records, such as records 505–520, each associated with a different recognized word or phrase. For each recognized word or phrase identified in field 530, the template-based translation table 500 includes a corresponding translation of the static component, with an embedded variable for the dynamic component, into each desired target language in fields 550 through 560.

Thus, the broadcaster may say, "The Dow Jones average rose 150 points in heavy trading" and the recognition algorithm understands that this is an example of the template "The Dow Jones average rose <number> points in heavy trading". The speech recognition algorithm will transmit the number of the template (1 in this example) and the value of the variable (150). On the output side, the phrase-splicing or other speech synthesizer inserts the value of the variable into the template and produces, for example "Le Dow Jones a gagné 150 points lors d'une scéance particulièrement active."

PHRASE-BASED TRANSLATION

Figure 6:
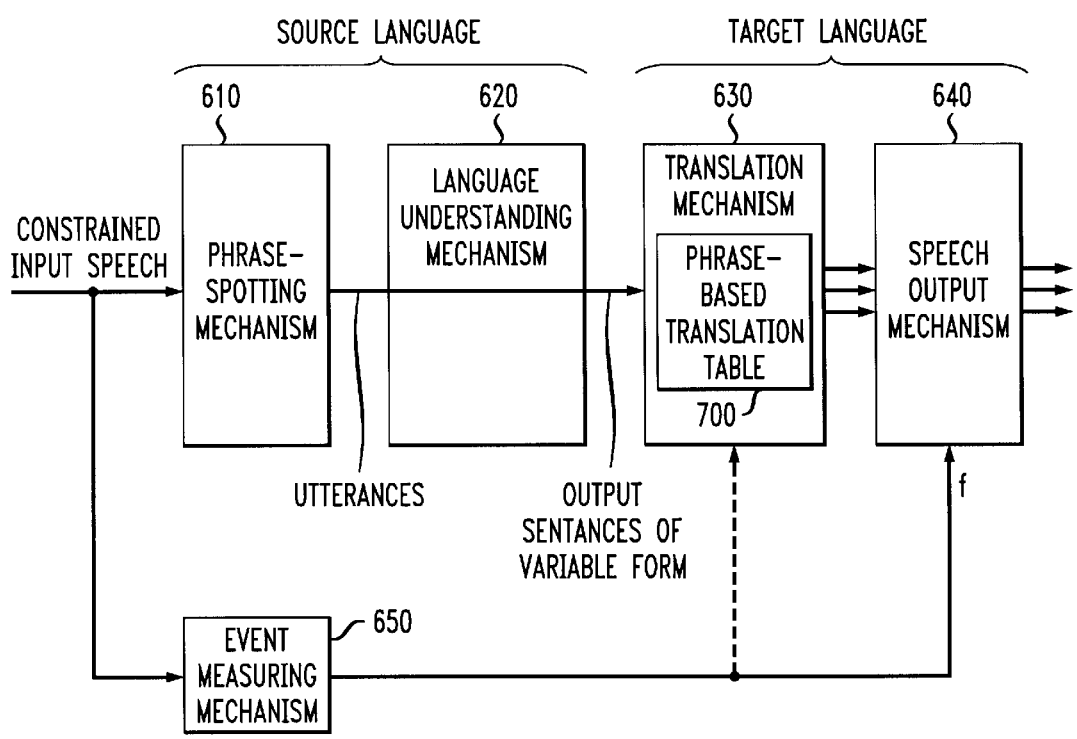
FIG. 6 is a schematic block diagram of a phrase-based embodiment of a multi-lingual time-synchronized translation system in accordance with the present invention.

In a phrase-based translation embodiment, shown in FIG. 6, the phrase spotting mechanism 610 is now a limited domain speech recognition system with an underying statistical language model. Thus, in the phrase-based translation embodiment, the phrase-spotting mechanism 610 may be embodied, for example, as the IBM ViaVoice Millenium Edition™ (1999), commercially available from IBM Corporation, as modified herein to provide the features and functions of the present invention. The phrase-based translation embodiment permits more flexibility on the input speech than the template-based translation embodiment discussed above.

The output of the phrase spotting mechanism 610 is presented to a language understanding mechanism 620 that maps the input sentence onto a relatively small number of output sentences of a variable form as in the template-based translation described above. For a discussion of feature-based mapping techniques, see, for example, K. Papineni, S. Roukos and T. Ward "Feature Based Language Understanding," Proc. Eurospeech '97, incorporated by reference herein. Once the language understanding mechanism 620 has performed the mapping, the rest of the process for translation and speech output generation is the same as described above for template-based translation. The translation mechanism 630 contains a translation table 700 containing an entry for each recognized word or phrase in the canonical set of words or phrases. The translation mechanism 630 maps each phrase over to the speech output mechanism 640.

The speech output mechanism 640 employs a speech synthesis technique to translate the text in the phrase-based translation table 700 into speech.

As previously indicated, the phrase-based translation table 700, shown in FIG. 7, preferably contains an entry for each word or phrase in the canonical set of words or phrases. The phrase-based translation table 700 translates each recognized word or phrase into one or more target languages. As shown in FIG. 7, the phrase-based translation table 700 maintains a plurality of records, such as records 705–720, each associated with a different recognized word or phrase. For each recognized word or phrase identified in field 730, the phrase-based translation table 700 includes a corresponding translation into each desired target language in fields 750 through 760.

Thus, the recognition algorithm transcribes the spoken sentence, a natural-language-understanding algorithm determines the semantically closest template, and transmits only the template number and the value(s) of any variable(s). Thus the broadcaster may say "In unusually high trading volume, the Dow rose 150 points" but because there is no exactly matching template, the NLU algorithm picks "The Dow rose 150 points in heavy trading."

FIG. 8 is a schematic block diagram of the event measuring mechanism 150, 250, 450 and 650 of FIGS. 1, 2, 4 and 6, respectively. As shown in FIG. 8, the illustrative event measuring mechanism 150 may be implemented using a speech recognition system that provides the start and end times of words and phrases. Thus, the event measuring mechanism 150 may be embodied, for example, as the IBM ViaVoice Millenium Edition™ (1999), commercially available from IBM Corporation, as modified herein to provide the features and functions of the present invention. The start and end times of words and phrases may be obtained from the IBM ViaVoice™ speech recognition system, for example, using the SMAPI application programming interface.

Thus, the exemplary event measuring mechanism 150 has an SMAPI interface 810 that extracts the starting time for the first words of a phrase, $T_1$, and the ending time for the last word of a phrase, $T_2$. In further variations, the duration of individual words, sounds, or intra-word or utterance silences may be measured in addition to, or instead of, the overall duration of the phrase. The SMAPI interface 810 transmits the starting and ending time for the phrase, $T_1$ and $T_2$, to a timing computation block 850 that performs computations to determine at what time and at what speed to play back the target phrase. Generally, the timing computation block 850 seeks to time compress phrases that are longer (for example, by removing silence periods or speeding up the playback) and lengthen phrases that are too short (for example, by padding with silence or slowing down the playback).

If time-synchronization in accordance with one aspect of the present invention is not desired, then the timing computation block 850 can ignore $T_1$ and $T_2$. Thus, the timing computation block 850 will instruct the speech output mechanism 140 to simply start the playback of the target phrase as soon as it receives the phrase from the translation mechanism 130, and to playback of the target phrase at a normal rate of speed.

If speed normalization is desired, the timing computation block 850 can calculate the duration, $D_S$, of the source phrase as the difference $D_1 = T_2 - T_1$. The timing computation block 850 can then determine the normal duration, $D_T$, of the target phrase, and will then apply a speedup factor, $f$, equal to $D_T/D_S$. Thus, if the original phrase lasted two (2) seconds, but the translated target phrase would last 2.2 seconds at its normal speed, the speedup factor will be 1.1, so that in each second the system plays 1.1 seconds worth of speech.

It is noted that speedup factors in excess of 1.1 or 1.2 tend to sound unnatural. Thus, it may be necessary to limit the speedup. In other words, the translated text may temporarily fall behind schedule. The timing computation algorithm can then reduce silences and accelerate succeeding phrases to catch up.

In a further variation the duration of the input phrases or the output phrases, or both, can be adjusted in accordance with the present invention. It is noted that it is generally more desirable to stretch the duration of a phrase than to shorten the duration. Thus, the present invention provides a mechanism for selectively adjusting either the source language phrase or the target language phrase. Thus, according to an alternate embodiment, for each utterance, the timing computation block 850 determines whether the source language phrase or the target language phrase has the shorter duration, and then increases the duration of the phrase with the shorter duration.

The speech may be normalized, for example, in accordance with the teachings described in S. Roucos and A. Wilgus, "High Quality Time Scale Modifiction for Speech," ICASSP '85, 493–96 (1985), incorporated by reference herein.

It is to be understood that the embodiments and variations shown and described herein are merely illustrative of the principles of this invention and that various modifications may be implemented by those skilled in the art without departing from the scope and spirit of the invention.

What is claimed is:

1. A system for translating a source language into at least one target language, comprising:
    a phrase-spotting system for identifying a spoken phrase from a restricted domain of phrases;
    a set of prerecorded translations of said restricted domain of phrases; and
    a playback mechanism for reproducing said spoken phrase in said at least one target language, wherein a duration of said prerecorded translation is adjusted to approximately match a duration of said spoken phrase.

2. The system of claim 1, wherein said phrase-spotting system measures the duration of said spoken phrase.

3. The system of claim 1, wherein said phrase-spotting system measures the duration of internal events in said spoken phrase.

4. The system of claim 3, wherein the duration of said prerecorded translation is adjusted to approximately match the duration of said spoken phrase less the duration of said internal specific events in said spoken phrase.

5. The system of claim 3, wherein said internal events are inter-word pauses.

6. The system of claim 1, wherein said duration is measured using a speech recognition system.

7. The system of claim 1, wherein said phrase-spotting system is embodied as a speech recognition system.

8. A system for translating a source language into at least one target language, comprising:
    a phrase-spotting system for identifying a spoken phrase from a restricted domain of phrases, said restricted domain of phrases having a static component and a dynamic component;
    a set of prerecorded translations of said static components and said dynamic components of said restricted domain of phrases; and
    a playback mechanism for reproducing said spoken phrase in said at least one target language using said prerecorded translations of said static components and said dynamic components, wherein the duration of said prerecorded translation is adjusted to approximately match the duration of said spoken phrase.

9. The system of claim 8, wherein said phrase-spotting system measures the duration of said spoken phrase.

10. The system of claim 8, wherein said phrase-spotting system measures the duration of internal events in said spoken phrase.

11. The system of claim 10, wherein the duration of said prerecorded translation is adjusted to approximately match the duration of said spoken phrase less the duration of said internal specific events in said spoken phrase.

12. The system of claim 10, wherein said internal events are inter-word pauses.

13. The system of claim 8, wherein said duration is measured using a speech recognition system.

14. The system of claim 8, wherein said phrase-spotting system is embodied as a speech recognition system.

15. The system of claim 8, wherein said playback mechanism employs a phrase-splicing based synthesis system.

16. The system of claim 8, wherein a dynamic component of a recognized spoken phrase is converted to a dynamic component in said target language using a finite-state transducer.

17. A system for translating a source language into at least one target language, comprising:
- a natural-language understanding system that infers a phrase in an underlying formal language from a spoken phrase;
- a text production mechanism in which a formal language phrase is converted to natural text in said at least one target language;
- a set of prerecorded translations in said at least one target language; and
- a playback mechanism driven by said natural text for reproducing said spoken phrase in said at least one target language using said prerecorded translations, wherein the duration of said prerecorded translation is adjusted to approximately match the duration of said spoken phrase.

18. The system of claim 17, wherein a speech recognition system measures the duration of said spoken phrase.

19. The system of claim 17, wherein a speech recognition system measures the duration of internal events in said spoken phrase.

20. The system of claim 19, wherein the duration of said prerecorded translation is adjusted to approximately match the duration of said spoken phrase less the duration of said internal specific events in said spoken phrase.

21. The system of claim 19, wherein said internal events are inter-word pauses.

22. The system of claim 17, wherein said playback mechanism employs a phrase-splicing based synthesis system.

23. The system of claim 17, wherein a recognized spoken phrase is converted to said target language using a finite-state transducer.

24. A system for translating a source language into at least one target language, comprising:
- a phrase-spotting system for identifying a spoken phrase from a restricted domain of phrases;
- a set of prerecorded translations of said restricted domain of phrases; and
- a playback mechanism for reproducing said spoken phrase in said at least one target language, wherein the duration of said spoken phrase or said prerecorded translation is adjusted to synchronize said spoken phrase and said prerecorded translation.

25. The system of claim 24, wherein said adjustment of said duration of said spoken phrase or said prerecorded translation is performed such that the maximum duration modification performed on either said spoken phrase or said prerecorded translation is less than a pre-determined threshold.

26. The system of claim 25, wherein said adjustment of said duration of said spoken phrase or said prerecorded translation first determines whether said spoken phrase or said prerecorded translation has the shorter duration, and then increases the duration of said phrase with the shorter duration.

27. A method for translating a source language into at least one target language, comprising:
- identifying a spoken phrase from a restricted domain of phrases;
- obtaining a prerecorded translation of said spoken phrase; and
- reproducing said spoken phrase in said at least one target language, wherein a duration of said prerecorded translation is adjusted to approximately match a duration of said spoken phrase.

28. The method of claim 27, further comprising the step of measuring the duration of internal events in said spoken phrase.

29. The method of claim 28, wherein the duration of said prerecorded translation is adjusted to approximately match the duration of said spoken phrase less the duration of said internal specific events in said spoken phrase.

30. The method of claim 28, wherein said internal events are inter-word pauses.

31. The method of claim 27, wherein said duration is measured using a speech recognition method.

32. The method of claim 27, wherein said identifying step is performed by a speech recognition system.

33. A method for translating a source language into at least one target language, comprising:
- identifying a spoken phrase from a restricted domain of phrases, said restricted domain of phrases having a static component and a dynamic component;
- obtaining a prerecorded translation of said static components and said dynamic components of said spoken phrase; and
- reproducing said spoken phrase in said at least one target language using said prerecorded translations of said static components and said dynamic components, wherein the duration of said prerecorded translation is adjusted to approximately match the duration of said spoken phrase.

34. The method of claim 33, further comprising the step of measuring the duration of internal events in said spoken phrase.

35. The method of claim 34, wherein the duration of said prerecorded translation is adjusted to approximately match the duration of said spoken phrase less the duration of said internal specific events in said spoken phrase.

36. The method of claim 34, wherein said internal events are inter-word pauses.

37. The method of claim 33, wherein said duration is measured using a speech recognition method.

38. The method of claim 33, wherein said identifying step is performed by a speech recognition system.

39. The method of claim 33, wherein said reproducing step employs a phrase-splicing based synthesis system.

40. The method of claim 33, wherein a dynamic component of a recognized spoken phrase is converted to a dynamic component in said target language using a finite-state transducer.

41. A method for translating a source language into at least one target language, comprising:
- inferring a phrase in an underlying formal language from a spoken phrase using a natural-language understanding system;
- converting a formal language phrase to natural text in said at least one target language;
- obtaining a prerecorded translation in said at least one target language; and
- reproducing said spoken phrase in said at least one target language using said prerecorded translations and driven by said natural text, wherein the duration of said prerecorded translation is adjusted to approximately match the duration of said spoken phrase.

42. The method of claim 41, further comprising the step of measuring the duration of internal events in said spoken phrase.

43. The method of claim 42, wherein the duration of said prerecorded translation is adjusted to approximately match the duration of said spoken phrase less the duration of said internal specific events in said spoken phrase.

44. The method of claim 42, wherein said identifying step is performed by a speech recognition system.

45. The method of claim 42, wherein said duration is measured using a speech recognition method.

46. The method of claim 42, wherein a recognized spoken phrase is converted to said target language using a finite-state transducer.

47. The method of claim 42, wherein said reproducing step employs a phrase-splicing based synthesis system.

48. The method of claim 43, wherein said internal events are inter-word pauses.

49. A method for translating a source language into at least one target language, comprising:
  identifying a spoken phrase from a restricted domain of phrases;
  obtaining a prerecorded translation of said spoken phrase; and
  reproducing said spoken phrase in said at least one target language, wherein the duration of said spoken phrase or said prerecorded translation is adjusted to synchronize said spoken phrase and said prerecorded translation.

50. The method of claim 49, wherein said adjustment of said duration of said spoken phrase or said prerecorded translation is performed such that the maximum duration modification performed on either said spoken phrase or said prerecorded translation is less than a pre-determined threshold.

51. The method of claim 49, wherein said adjustment of said duration of said spoken phrase or said prerecorded translation first determines whether said spoken phrase or said prerecorded translation has the shorter duration, and then increases the duration of said phrase with the shorter duration.

52. A system for translating a source language into at least one of a plurality of target languages, comprising:
  a memory that stores computer-readable code; and
  a processor operatively coupled to said memory, said processor configured to implement said computer-readable code, said computer-readable code configured to:
  identify a spoken phrase from a restricted domain of phrases;
  obtain a prerecorded translation of said spoken phrase; and
  reproduce said spoken phrase in said at least one target language, wherein a duration of said prerecorded translation is adjusted to approximately match a duration of said spoken phrase.

53. An article of manufacture, comprising:
  a computer readable medium having computer readable code means embodied thereon, said computer readable program code means comprising:
  a step to identify a spoken phrase from a restricted domain of phrases;
  a step to obtain a prerecorded translation of said spoken phrase; and
  a step to reproduce said spoken phrase in said at least one target language, wherein a duration of said prerecorded translation is adjusted to approximately match a duration of said spoken phrase.

54. A system for translating a source language into at least one of a plurality of target languages, comprising:
  a memory that stores computer-readable code; and
  a processor operatively coupled to said memory, said processor configured to implement said computer-readable code, said computer-readable code configured to:
  identify a spoken phrase from a restricted domain of phrases, said restricted domain of phrases having a static component and a dynamic component;
  obtain a prerecorded translation of said static components and said dynamic components of said spoken phrase; and
  reproduce said spoken phrase in said at least one target language using said prerecorded translations of said static components and said dynamic components, wherein the duration of said prerecorded translation is adjusted to approximately match the duration of said spoken phrase.

55. An article of manufacture, comprising:
  a computer readable medium having computer readable code means embodied thereon, said computer readable program code means comprising:
  a step to identify a spoken phrase from a restricted domain of phrases, said restricted domain of phrases having a static component and a dynamic component;
  a step to obtain a prerecorded translation of said static components and said dynamic components of said spoken phrase; and
  a step to reproduce said spoken phrase in said at least one target language using said prerecorded translations of said static components and said dynamic components, wherein the duration of said prerecorded translation is adjusted to approximately match the duration of said spoken phrase.

56. A system for translating a source language into at least one of a plurality of target languages, comprising:
  a memory that stores computer-readable code; and
  a processor operatively coupled to said memory, said processor configured to implement said computer-readable code, said computer-readable code configured to:
  infer a phrase in an underlying formal language from a spoken phrase using a natural-language understanding system;
  convert a formal language phrase to natural text in said at least one target language;
  obtain a prerecorded translation in said at least one target language; and
  reproduce said spoken phrase in said at least one target language using said prerecorded translations and driven by said natural text, wherein the duration of said prerecorded translation is adjusted to approximately match the duration of said spoken phrase.

57. An article of manufacture, comprising:
  a computer readable medium having computer readable code means embodied thereon, said computer readable program code means comprising:
  a step to infer a phrase in an underlying formal language from a spoken phrase using a natural-language understanding system;
  a step to convert a formal language phrase to natural text in said at least one target language;
  a step to obtain a prerecorded translation in said at least one target language; and
  a step to reproduce said spoken phrase in said at least one target language using said prerecorded translations and driven by said natural text, wherein the duration of said prerecorded translation is adjusted to approximately match the duration of said spoken phrase.

* * * * *

UNITED STATES PATENT AND TRADEMARK OFFICE
CERTIFICATE OF CORRECTION

PATENT NO. : 6,556,972 B1
DATED : April 29, 2003
INVENTOR(S) : Bakis et al.

It is certified that error appears in the above-identified patent and that said Letters Patent is hereby corrected as shown below:

Title page,
Item [73], Assignee, the following Assignees should be listed:
-- International Business Machines Corporation, Armonk, NY (US)
   OIPENN, Inc., New York, NY (US) --

Signed and Sealed this

Fourth Day of November, 2003

JAMES E. ROGAN
*Director of the United States Patent and Trademark Office*